Figure 1:
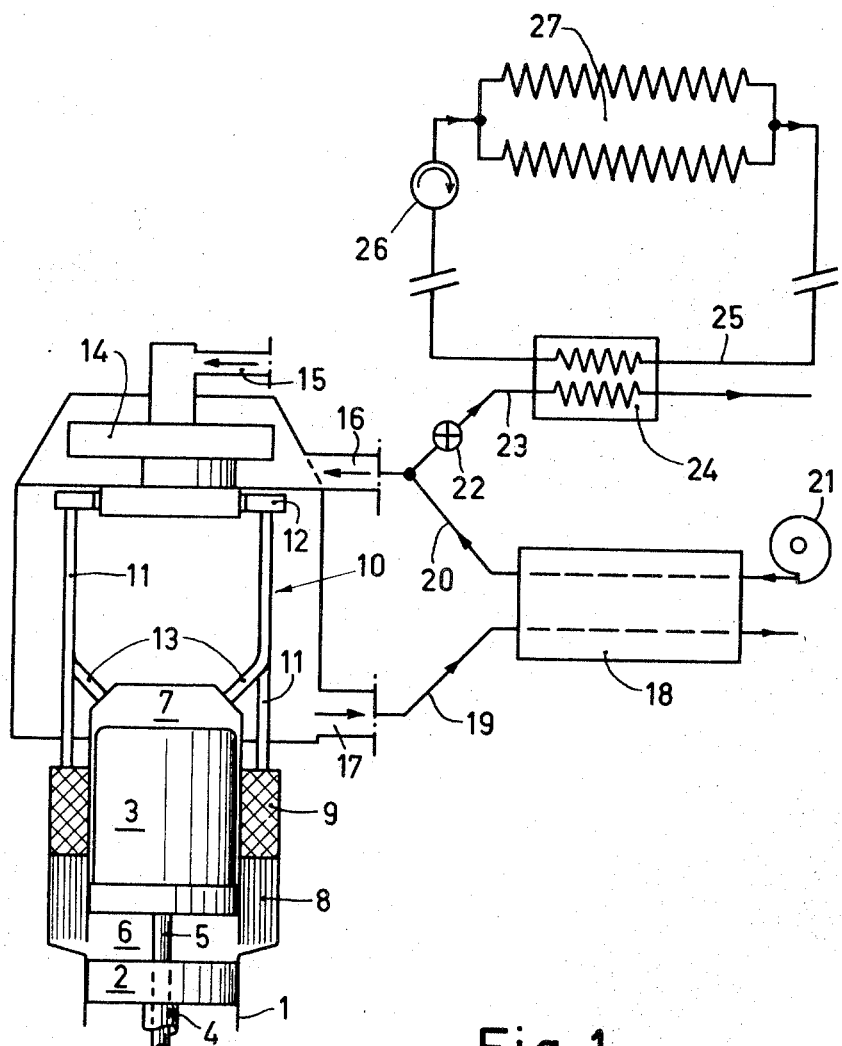

United States Patent
Fokker

[15] 3,656,295
[45] Apr. 18, 1972

[54] HEATING DEVICE FOR A VEHICLE UTILIZING A HOT-GAS ENGINE

[72] Inventor: Herman Fokker, Emmasingel, Eindhoven, Netherlands

[73] Assignee: U.S. Philips Corporation, New York, N.Y.

[22] Filed: May 27, 1970

[21] Appl. No.: 40,872

[30] Foreign Application Priority Data

June 5, 1969 Netherlands.....................6908536

[52] U.S. Cl..............................................60/24, 237/12.3 B
[51] Int. Cl..........................................F03g 7/06, B60h 1/20
[58] Field of Search..................................60/24; 237/12.3 B

[56] References Cited

UNITED STATES PATENTS

| | | | |
|---|---|---|---|
| 3,456,438 | 7/1969 | Meijer et al. | 60/24 |
| 1,057,485 | 4/1913 | Knollmann | 237/12.3 B |
| 1,231,208 | 6/1917 | Semmler | 237/12.3 B |
| 3,546,876 | 12/1970 | Fokker et al. | 60/24 |

Primary Examiner—Allan D. Herrmann
Attorney—Frank R. Trifari

[57] ABSTRACT

A hot-gas engine having a system for heating a fluid such as water with heat from some of the air that is pre-heated for combustion in the engine's burner, the fluid providing heat via a heat exchanger to the atmosphere.

8 Claims, 2 Drawing Figures

INVENTOR.
HERMAN FOKKER

HEATING DEVICE FOR A VEHICLE UTILIZING A HOT-GAS ENGINE

The invention relates to a heating device, particularly suitable for vehicles employing a hot-gas engine, which includes at least one compression space of variable volume and a lower average temperature communicating with at least one expansion space of variable volume and higher average temperature; the engine also comprises a regenerator and a heater in communication between said spaces through which a working medium can reciprocate between the said spaces, and at least one burner device with at least one inlet for air of combustion and at least one outlet for gases of combustion which communicate via a preheater.

In vehicles utilizing internal combustion engines it is known to withdraw heat for heating purposes from the cooling water or from the exhaust gases. In this case the cooling water circuit usually comprises a radiator in which the warm water from the engine supplies its heat to the ambient air surrounding the radiator. The exhaust gases are often conducted through a heat exchanger or through a system of pipes of a heat-conducting material in which said gases can supply heat to the air within the vehicle. The use of exhaust gases or gases of combustion for heating vehicles utilizing an internal combustion engine or an hot-gas engine involves the danger, that in the case of leakage of the heat exchanger or the system of pipes as a result of corrosion by said gases or by other causes as shocks, impacts and vibrations, the air in the vehicle is subject to a considerable pollution which is harmful to the occupants.

When the hot-gas engine is used for heating vehicles, the problem presents itself, that in the case of low temperatures of the ambient air, the air which surrounds the radiator is insufficiently heated and therefore is supplied to the interior of the vehicle in a comparatively cold condition, which results in insufficient heating of the vehicle's interior. The quantity of air which flows along the radiator could be reduced per unit of time, so that said reduced quantity is heated to a higher temperature. The result of this is a condition in which the temperature level of the water in the radiator and the system of ducts is higher than in the original condition which in turn gives rise to a higher temperature of the cooler and of the compression space. Since in a hot-gas engine it is of great importance for reaching a good efficiency that the temperature difference between the expansion space and the compression space is as large as possible, the rise in temperature of the compression space means a reduction in efficiency which is undesirable. Moreover, in hot-gas engines comprising liquid-supported rolling diaphragm seals between the piston and cylinder walls, as is known, for example, from U.S. Pat. No. 3,241,379, said rolling diaphragms are subjected to higher temperatures which adversely influences their lifetime. When in the hot-gas engine the gases of combustion originating from the preheater are brought in heat-exchanging relationship in a heat exchanger with water which is present in a closed circuit, measures should be taken to protect the side of the heat exchanger heated by the gases of combustion against corrosion. Furthermore the temperature differences available between the gases of combustion and the water are small since the temperature of the gases of combustion has dropped considerably by the heat exchange with the air of combustion in the pre-heater. In this case the water is insufficiently heated and/or the heat exchanger becomes too bulky. It is just the comparatively low temperatures of the gases of combustion that cause the above-mentioned corrosion by the deposition of sulphur-containing components in the heat exchanger. In one prior art publication at least a part of the gases of combustion is brought directly, without passing a preheater, in heat exchanging contact with the cooling water in the cooling water circuit of a hot-gas engine. After the warm cooling water from the engine has been further heated by the gases of combustion, said water, in a radiator, again supplies heat to the ambient atmosphere. Although in this case gases of combustion of higher temperature exchange heat with the cooling water, the problem again presents itself of corrosion of the heat exchanger used. At the same time the cooling water arrives again at the cooler of the compression space at a comparatively high temperature so that the temperature of the compression space rises and the efficiency of the hot-gas engine decreases.

It is the object of the invention to provide a heating device comprising a hot-gas engine in which the hot-gas engine is efficiently used and in which the above-mentioned drawbacks are avoided.

The heating device according to the invention is characterized in that a system of ducts is present which communicates at one end with that part of the inlet which is situated between the preheater and the burner device, and a control device is present for controlling the supply of the air of combustion to said system of ducts, the said system incorporating furthermore at least one heat exchanger in which air of combustion can exchange heat with a medium which can circulate in a closed auxiliary system of ducts, at least a part of the auxiliary system of ducts being suitable for heat transfer of the medium to the atmosphere.

During normal operation of the hot-gas engine the preheater always is in unbalance. This is caused by the fact that the specific heat Cp of the gases of combustion is larger than that of the air of combustion while also the mass flow $m$ of gases of combustion through the preheater is larger than the mass flow of air of combustion which passes through the preheater in counter-current with the gases of combustion.

By the addition of an additional quantity of air of combustion to the quantity normally supplied to the preheater, the preheater comes in balance. This means that the thermal losses are considerably reduced since a great part of the thermal energy which is otherwise lost is now used to heat the additional quantity of air of combustion to a high temperature. A temperature gradient is adjusted across the preheater, viewed in the direction of flow, in which the same temperature difference prevails at any point between the gases of combustion and the air of combustion.

The additional quantity of the air of combustion heated to a high temperature can be used advantageously to heat the medium in the system of auxiliary ducts to the desirable high temperature. For that purpose, said quantity, after leaving the preheater, is branched from the total flow of air of combustion and supplied to the system of ducts in which the heat exchanger is situated for heat exchange with the medium. Since the air of combustion is substantially not corrosive, said heat exchanger can be of a comparatively simple and cheap construction while in the case a leakage should occur in said heat exchanger or in the system of ducts, the danger of air pollution is not present.

The heat exchanger may also be of a compact construction since on the one hand, owing to the high temperature of the gases of combustion, a large effective average temperature difference is available between the air of combustion and the medium and on the other hand, relative to the preheater, only a fraction of the preheated air of combustion is conducted through the heat exchanger.

In addition to the possibilities of heating the medium in the auxiliary system of ducts to a high temperature via a comparatively simple, compact and cheap heat exchanger without the danger of air pollution, it is also achieved, owing to efficient use of the preheater, that the overall efficiency of the hot-gas engine is substantially maintained. Although it is possible to exhaust the branched air of combustion after heat exchange with the medium in the auxiliary system of ducts to the atmosphere, it may be of advantage in circumstances to further use the thermal energy still present in said quantity of air of combustion.

In a favourable embodiment of the heating device according to the invention, the other end of the system of ducts communicates with that part of the supply for air of combustion, which is situated on the side of the preheater remote from the burner device.

By mixing the additional air of combustion, which after heat exchange with the medium is still comparatively warm, with the normal quantity of air of combustion to be supplied to the preheater, the temperature of the air supplied to the preheater rises. This results in a rise in temperature of the gases of combustion in the preheater which may be of importance in the case of partial load of the hot-gas engine or at low ambient temperatures, when the gases of combustion in the preheater can assume a comparatively low temperature and the danger of corrosion of the preheater consequently increases. In order to produce a rise in temperature of the gases of combustion it is alternatively possible, instead of sucking air of combustion from outside the vehicle, to withdraw it fully or partly from within the vehicle, since the air inside the vehicle generally has a higher temperature than the air outside the vehicle.

In a further favourable embodiment of the heating device according to the invention the medium present in the auxiliary system of ducts is a liquid, for example, water.

The use of a liquid, for example, water, makes it possible, owing to the good heat transfer properties, to choose an extra small heat exchanger in which the air of combustion can supply thermal energy to said liquid. At the same time, the pipes of the closed auxiliary system of ducts which can transfer heat to the atmosphere may have small diameters and radiators incorporated in said system, respectively, may have small dimensions.

Figure 2:
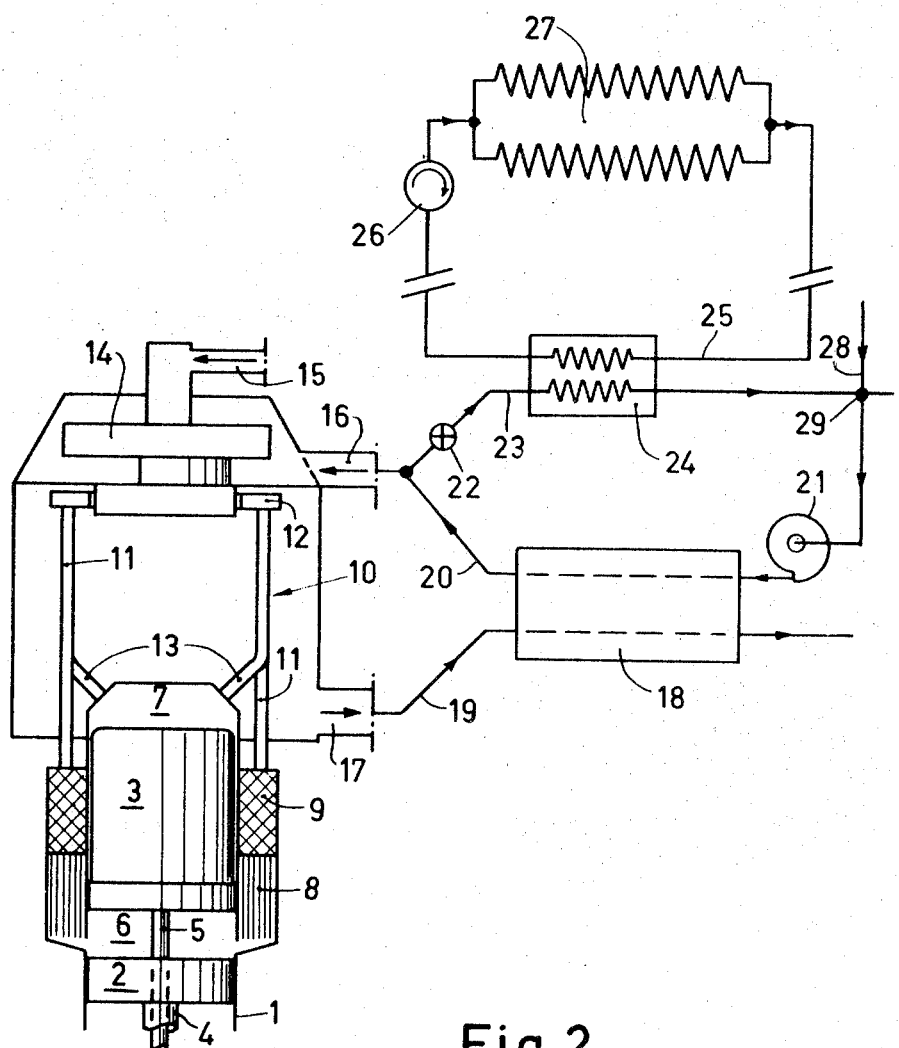

In order that the invention may be readily carried into effect, embodiments thereof will now be described in greater detail, by way of example, with reference to the accompanying diagrammatic drawings which are not drawn to scale and in which FIGS. 1 and 2 show embodiments of the heating device according to the invention.

Reference numeral 1 in FIG. 1 denotes a cylinder in which a piston 2 and a displacer 3 can reciprocate with a phase difference. The piston 2 and the displacer 3 are connected to a driving mechanism (not shown) by a piston rod 4 and a displacer rod 5, respectively. A compression space 6 is present between the piston 2 and the displacer 3, while above the displacer 3 an expansion space 7 is present. The compression space 6 and the expansion space 7 communicate with each other via a cooler 8, a regenerator 9 and a heater 10. The heater 10 is constructed from a number of pipes 11 which communicate at one end with the regenerator 9 and at the other end with an annular duct 12 and from a number of pipes 13 which communicate at one end with the annular duct 12 and at the other end with the expansion space 7. The hot-gas engine furthermore comprises a burner device 14 to which a supply 15 for fuel is connected. The burner device 14 furthermore comprises an inlet 16 for air of combustion and an outlet 17 communicating via the heater 10 for gases of combustion. The outlet 17 communicates with a duct 19.

The engine furthermore comprises the preheater 18 which communicates, via a duct 19, with the outlet 17, and via a duct 20, with the inlet 16. The gases of combustion can exchange heat with the air of combustion in said preheater. A controllable fan 21 is present for sucking in air of combustion.

A duct 23 in which a control cock 22 and a heat exchanger 24 are incorporated, communicates with the duct 20, the said heat exchanger also forming part of a closed auxiliary system of ducts 25. Said auxiliary system of ducts contains water which can circulate in the direction denoted by arrows by means of a pumping device 26. The closed auxiliary system of ducts 25 furthermore comprises a radiator 27.

The operation of this device is as follows:

During normal operation of the hot-gas engine and in circumstances in which the heating device is not in operation, the fan 21 sucks in the normal quantity of air of combustion and the control cock 22 is in the closed position so that all the air of combustion is conducted to the inlet 16. The preheater 18 then is in unbalance, since the gases of combustion conducted to the preheater 18 via the outlet 17 and the duct 19 have a considerably larger heat-content than the sucked-in normal quantity of the air of combustion as a result of the larger specific heat $C_p$ and larger mass flow.

When the heating device is to be switched on, the fan 21 is adjusted so that the quantity of sucked-in air has a value which is higher than the original value, for example, 20 percent more. The preheater now comes in balance. This presents the great advantage that a considerable part of the heat-content of the gases of combustion is no longer lost. The excess of 20 percent of air of combustion, after heating in the preheater to a high temperature, for example, 800° C, is now conducted to the heat exchanger 24 via the duct 23. This is achieved by suitably adjusting the control valve 22 so that five-sixth part of the overall flow flows to the inlet 16 and the remainder to the heat exchanger 24.

The branched air of combustion of high temperature in the heat exchanger 24 is in counter-current heat exchange with the water circulating in the closed auxiliary system of ducts 25 by means of the pumping device 26. The water is considerably heated, for example, to 90° C and afterwards supplies its thermal energy in the radiator 27 for the greater part again to the atmosphere. For heating purposes, the radiator 27 may be accommodated in a space, for example, the interior of a vehicle in which the hot-gas engine is present as a traction engine. Of course it is also possible to use the system of ducts itself fully or partly for heat transfer to the atmosphere. In that case, for example, ribbed pipes of a heat conducting material could be used.

FIG. 2 shows a heating device which in general is similar to that shown in FIG. 1 and in which like reference numerals are used for like components. The only difference is that the duct 23 in this case communicates at its other end with the suction duct 28 for air of combustion of the fan 21.

Air of combustion which in the heat exchanger 24 has supplied its thermal energy for the greater part to the water but is still relatively warm can mix at the area 29 with the air of combustion sucked in via the suction duct 28. This is of advantage in particular when the air sucked in via the suction duct 28 has a comparatively low temperature so that the gases of combustion are cooled comparatively strongly in the preheater and the danger of corrosion of the preheater by said gases of combustion increases. By returning the branched quantity of air of combustion, the air supplied to the preheater 18 will rise in temperature which again results in a rise in temperature of gases of combustion in the preheater 18 so that the danger of corrosion is reduced. Similarly, the return possibility may be used in the case of partial load of the hot-gas engine when the gases of combustion are cooled to a comparatively low temperature in the preheater 18.

It will be obvious from the above that the invention provides a heating device of a hot-gas engine in which the space to be heated remains free from air pollution by exhaust gases in the case of any leakage. A good efficiency of the hot-gas engine device is maintained while a compact heat exchanger can be used.

What is claimed is:

1. In a hot-gas engine including a burner with an inlet for air and fuel and an outlet for exhaust gas, and a pre-heater including a first passage therethrough for said exhaust gas and a second passage for said air, this second passage including an outlet communicating with the burner inlet, the improvement in combination therewith of an auxiliary heating system comprising, first duct means for containing a heat-exchange fluid, means for circulaitng fluid in said duct means, a heat exchanger, second duct means communicating air from said pre-heater outlet to said heat-exchanger, whereby said fluid is heatable from air heated by said exhaust gas.

2. A heating device for use with vehicles driven by a hot-gas engine including a burner with an inlet for air and fuel and an outlet for exhaust gas, and a pre-heater including a first passage therethrough for said exhaust gas and a second passage for said air, this second passage including an outlet communicating with the burner inlet, the heating device comprising, first duct means for containing a heat-exchange fluid, means for circulating fluid in said duct means, a heat-exchanger, second duct means communicating air from said pre-heater outlet to said heat-exchanger, whereby said fluid is heatable from air heated by said exhaust gas.

3. In a hot-gas engine including a burner with an inlet for air and fuel and an outlet for exhaust gas, and a pre-heater including a first passage therethrough for said exhaust gas and a second passage for said air, This second passage including an outlet communicating with the burner inlet, the improvement in combination therewith of an auxiliary heating system comprising, first duct means for containing water as a heat-exchange fluid, means for circulating the fluid in said first duct means, a heat-exchanger, second duct means communicating air from said preheater outlet to said heat-exchanger, whereby said fluid is heatable from air heated by said exhaust gas, and a second heat-exchanger for heat transfer from said fluid to atmosphere adjacent said first duct means.

4. Apparatus according to claim 1 wherein said first duct means is a closed system and comprises means for controlling the circulation of fluid therethrough.

5. Apparatus according to claim 2 wherein said first duct means further comprises means for heat-exchange between said fluid and atmosphere adjacent said first duct means.

6. Apparatus according to claim 1 wherein said fluid is water.

7. Apparatus according to claim 2 wherein said fluid is water.

8. Apparatus according to claim 1, further comprising duct means for communicating heat air from said heat exchanger back to the pre-heater air inlet.

* * * * *